United States Patent
Clarke

(10) Patent No.: US 10,744,566 B2
(45) Date of Patent: Aug. 18, 2020

(54) GEAR, A METHOD OF MANUFACTURING A GEAR AND A GEARED GAS TURBINE ENGINE

(71) Applicant: ROLLS-ROYCE plc, London (GB)

(72) Inventor: Derek W J Clarke, Bristol (GB)

(73) Assignee: Rolls-Royce plc, London ( * ) Notice: Subject to any disclaimer, the term of this patent is extended or adjusted under 35 U.S.C. 154(b) by 208 days.

(21) Appl. No.: 15/951,209

(22) Filed: Apr. 12, 2018

(65) Prior Publication Data

US 2018/0297119 A1   Oct. 18, 2018

(30) Foreign Application Priority Data

Apr. 13, 2017   (GB) .................................. 1705979.1

(51) Int. Cl.
  *B22F 5/08*   (2006.01)
  *F16H 55/06*   (2006.01)
  (Continued)

(52) U.S. Cl.
  CPC .............. *B22F 5/08* (2013.01); *B22F 3/1055* (2013.01); *B22F 7/02* (2013.01); *F01D 15/12* (2013.01);
  (Continued)

(58) Field of Classification Search
  CPC .. B22F 5/08; B22F 3/1055; B22F 7/02; F16H 55/17; F16H 1/28; F16H 55/06; F01D 15/12; F02C 7/36
  See application file for complete search history.

(56) References Cited

U.S. PATENT DOCUMENTS

| | | | |
|---|---|---|---|
| 5,271,287 A | 12/1993 | Wadleigh | |
| 9,101,979 B2 | 8/2015 | Hofmann et al. | |
| 2016/0003339 A1* | 1/2016 | Roberts, III | ............ F16H 55/06 74/446 |
| 2016/0146112 A1 | 5/2016 | Van der Merwe et al. | |

(Continued)

FOREIGN PATENT DOCUMENTS

| | | |
|---|---|---|
| DE | 102007002959 A1 | 8/2007 |
| DE | 102014003441 | 9/2015 |

(Continued)

OTHER PUBLICATIONS

Extended EP Search Report completed by the EP Searching Authority on Sep. 18, 2018 and issued in connection with EP Patent Application No. 18161999.0, 8 pages.

(Continued)

*Primary Examiner* — Patrick H Mackey
(74) *Attorney, Agent, or Firm* — Barnes & Thornburg LLP

(57) ABSTRACT

A gas turbine engine comprises a gearbox comprising a sun gear, an annulus gear, a plurality of planet gears and a carrier. The sun gear meshes with the planet gears and the planet gears mesh with the annulus gear. A planet gear comprises a first annular structure, a plurality of teeth extending radially from the first annular structure and a second annular structure abutting and secured to a cylindrical surface of the first annular structure. The first annular structure and the teeth consist of steel, the second annular structure comprises a metal matrix composite, the metal matrix comprising aluminium, aluminium alloy, steel, titanium or titanium alloy, the reinforcing material comprising titanium diboride, titanium carbide or titanium nitride. The second annular structure reduces the mass but maintains, or increases, the stiffness of the planet gear to carry centrifugal loads and to maintain roundness of the planet gears.

14 Claims, 3 Drawing Sheets

(51) Int. Cl.
    *F16H 55/17* (2006.01)
    *B22F 3/105* (2006.01)
    *B22F 7/02* (2006.01)
    *F01D 15/12* (2006.01)
    *F02C 7/36* (2006.01)
    *F16H 1/28* (2006.01)
    *F16H 57/08* (2006.01)
    *B33Y 10/00* (2015.01)
    *B33Y 70/00* (2020.01)
    *B33Y 80/00* (2015.01)

(52) U.S. Cl.
    CPC ............... *F02C 7/36* (2013.01); *F16H 1/28* (2013.01); *F16H 55/06* (2013.01); *F16H 55/17* (2013.01); *B33Y 10/00* (2014.12); *B33Y 70/00* (2014.12); *B33Y 80/00* (2014.12); *F05D 2230/22* (2013.01); *F05D 2260/40311* (2013.01); *F16H 57/08* (2013.01)

(56) References Cited

U.S. PATENT DOCUMENTS

2016/0298751 A1* 10/2016 McCune ............... B22F 3/1055
2017/0014910 A1     1/2017 Ng et al.

FOREIGN PATENT DOCUMENTS

| EP | 305113 | 3/1989 |
| EP | 3078836 A1 | 10/2016 |
| WO | 2014116254 | 7/2014 |
| WO | 2016124514 | 8/2016 |
| WO | 2016164789 | 10/2016 |
| WO | 2017015159 | 1/2017 |

OTHER PUBLICATIONS

Great Britain Search Report dated Aug. 30, 2017, issued in GB Patent Application No. 1705979.1.

\* cited by examiner

GEAR, A METHOD OF MANUFACTURING A GEAR AND A GEARED GAS TURBINE ENGINE

CROSS-REFERENCE TO RELATED APPLICATIONS

This specification is based upon and claims the benefit of priority from UK Patent Application Number 1705979.1 filed on 13 Apr. 2017, the entire contents of which are incorporated herein by reference.

BACKGROUND

The present disclosure concerns a geared gas turbine engine and in particular to a geared turbofan gas turbine engine or a geared turbo propeller gas turbine engine.

A geared turbofan gas turbine engine or a geared turbo propeller gas turbine engine comprises a gearbox which is arranged to drive the fan or propeller. The gearbox allows the fan, or the propeller, to rotate at a speed less than the speed of rotation of a turbine driving the gearbox. This enables the efficiency of the fan, or the propeller, and the efficiency of the turbine to be improved.

In one arrangement the gearbox comprises a sun gear which is arranged to be driven by a turbine, an annulus gear which is arranged to be static, planet gears meshing with the sun gear and the annulus gear and a carrier which is arranged to drive the fan, or the propeller, if the gearbox is a planetary gearbox. In another arrangement the gearbox comprises a sun gear which is arranged to be driven by a turbine, an annulus gear which is arranged to drive the fan, or the propeller, planet gears meshing with the sun gear and the annulus gear and a carrier which is arranged to be static if the gearbox is a star gearbox. In a further arrangement the gearbox comprises a sun gear which is arranged to be driven by a turbine, an annulus gear which is arranged to drive a first fan, or a first propeller, planet gears meshing with the sun gear and the annulus gear and a carrier which is arranged to drive a second fan, or a second propeller, if the gearbox is a differential gearbox. In another arrangement the gearbox comprises a sun gear which is arranged to be driven by a turbine, an annulus gear which is arranged to drive a fan, or a propeller, planet gears meshing with the sun gear and the annulus gear and a carrier which is arranged to drive a compressor, if the gearbox is a differential gearbox.

In large, high speed, epicyclic, or planetary, gearboxes the gearbox must endure very high loads due to centrifugal loading from the rotating planet gears and the basic torque load which the gearbox is arranged to transmit. The carrier of the gearbox is required to support the loads applied to the planet gears and planet gear bearings, which may be generated by torque or centrifugally generated. The carrier must also maintain the positions of the gears very accurately to maintain adequate gear performance in terms of controlling the tooth loading and the noise, or vibration, levels.

In large, high speed, epicyclic, or planetary, gearboxes the centrifugal load of the planet gears on the planet gear bearings is very high making it difficult, or impossible, to use rolling element bearings. It has been proposed to increase the diameter of the planet gear bearings to carry the centrifugal load of the planet gears but this increases the diameter and mass of the planet gears. However, the increase in bearing capacity due to the increase of bearing diameter is offset by the increase of mass and centrifugal loads of the planet gears. It has also been proposed to use journal bearings, as an alternative to rolling element bearings, for the planet gears, but journal bearings are susceptible to damage if there is an interruption in lubricant supply.

Furthermore, the planet gears may suffer from stresses due to ring bending in the gear teeth roots. Ring bending may cause the planet gears to become non-circular and this adversely affects the circumferential load distribution in the bearing and introduces bending fatigue. In the case of rolling element bearings ring bending adversely affects the cage to bearing race contacts and in the case of journal bearings ring bending adversely affects lubricant film generation and pressure distribution.

SUMMARY

The present disclosure seeks to provide a geared gas turbine engine which reduces or overcomes this problem.

According to a first aspect of the present disclosure there is provided a gear comprising a first annular structure, a plurality of teeth extending radially from the first annular structure and a second annular structure abutting and secured to a cylindrical surface of the first annular structure, the first annular structure and the teeth consisting of steel, the second annular structure comprising a metal matrix composite, the metal matrix composite comprising a metal matrix and reinforcing material.

The metal matrix may comprise aluminium, aluminium alloy, steel, titanium or titanium alloy. The reinforcing material may comprise a ceramic material.

The steel may be gear steel or high strength steel.

The reinforcing material may comprise particles.

The reinforcing material may comprise fibres.

The reinforcing material may comprise one or more of alumina, boron, boron carbide, boron nitride, carbon, silicon carbide, silicon nitride, titanium carbide, titanium diboride, titanium nitride or tungsten carbide.

The cylindrical surface may be a radially inner surface, the teeth extend radially outwardly from the first annular structure and the second annular structure is arranged radially within the first annular structure.

The gear may be a sun gear or a planet gear.

The first annular structure, the teeth and the second annular structure may be a unitary monolithic structure.

The gear may be a planet gear, the planet gear comprises a third annular structure, the third annular structure is arranged radially within and secured to the second annular structure, the third annular structure comprises steel.

The steel may be gear steel or high strength steel.

The first annular structure, the teeth, the second annular structure and the third annular structure may be a unitary monolithic structure.

The cylindrical surface may be a radially outer surface, the teeth extend radially inwardly from the first annular structure and the second annular structure is arranged radially around the first annular structure.

The gear may be an annulus gear.

The first annular structure, the teeth and the second annular structure may be a unitary monolithic structure.

According to a second aspect of the present disclosure there is provided a method of manufacturing a gear, the gear comprising a first annular structure, a plurality of teeth extending radially from the first annular structure and a second annular structure abutting and secured to a cylindrical surface of the first annular structure, the first annular structure and the teeth consisting of steel, the second annular structure comprising a metal matrix composite, the metal matrix composite comprising a metal matrix and reinforcing material, the method comprising manufacturing the gear by additive layer manufacturing of powder material.

The gear may comprise a third annular structure, the third annular structure is arranged radially within and secured to the second annular structure, the third annular structure comprises steel, the method comprising manufacturing the third annular structure by additive manufacturing of powder material.

According to a third aspect of the present disclosure there is provided a method of manufacturing a gear, the gear comprising a first annular structure, a plurality of teeth extending radially from the first annular structure and a second annular structure abutting and secured to a cylindrical surface of the first annular structure, the first annular structure and the teeth consisting of steel, the second annular structure comprising a metal matrix composite, the metal matrix composite comprising a metal matrix and reinforcing material, the method comprising manufacturing the teeth and the first annular structure by additive manufacturing of powder material, manufacturing the second annular structure by sintering of powder material and joining the second annular structure to the first annular structure.

The method may comprise joining the second annular structure to the first annular structure by welding, diffusion bonding, brazing or by providing an interference fit.

According to a fourth aspect of the present disclosure there is provided a method of manufacturing a gear, the gear comprising a first annular structure, a plurality of teeth extending radially from the first annular structure and a second annular structure abutting and secured to a cylindrical surface of the first annular structure, the first annular structure and the teeth consisting of steel, the second annular structure comprising a metal matrix composite, the metal matrix composite comprising a metal matrix and reinforcing material, the method comprising manufacturing the first annular structure and teeth and forming the second annular structure on the first annular structure by additive manufacturing.

The method may comprise manufacturing the first annular structure and the teeth by additive manufacturing.

The method may comprise manufacturing the first annular structure and teeth by forming a ring and machining the teeth.

According to a fifth aspect of the present disclosure there is provided a method of manufacturing a gear, the gear comprising a first annular structure, a plurality of teeth extending radially from the first annular structure and a second annular structure abutting and secured to a cylindrical surface of the first annular structure, the first annular structure and the teeth consisting of steel, the second annular structure comprising a metal matrix composite, the metal matrix composite comprising a metal matrix and reinforcing material, the method comprising manufacturing at least a portion of the gear by additive manufacturing.

According to a sixth aspect of the present disclosure there is provided a gas turbine engine comprising a gearbox, the gearbox comprising a sun gear, an annulus gear, a plurality of planet gears and a planet gear carrier, the planet gears being rotatably mounted in the planet gear carrier, the sun gear meshing with the planet gears and the planet gears meshing with the annulus gear, wherein one or more of the sun gear, the annulus gear and a planet gear comprising a first annular structure, a plurality of teeth extending radially from the first annular structure and a second annular structure abutting and secured to a cylindrical surface of the first annular structure, wherein the first annular structure and the teeth comprising a unitary monolithic structure, the first annular structure and the teeth consisting of steel, the second annular structure comprising a metal matrix composite, the metal matrix composite comprising a metal matrix and reinforcing material.

The annulus gear may comprise a first annular structure and a second annular structure, a plurality of teeth extending radially from the first annular structure, the first annular structure having a cylindrical surface, the second annular structure abutting and being secured to the cylindrical surface of the first annular structure, wherein the first annular structure and the teeth comprising a unitary monolithic structure, the first annular structure and the teeth consisting of steel, the second annular structure comprising a metal matrix composite, the metal matrix composite comprising a metal matrix and reinforcing material.

The annulus gear and all of the planet gears may each comprise a first annular structure and a second annular structure, a plurality of teeth extending radially from the first annular structure, the first annular structure having a cylindrical surface, the second annular structure abutting and being secured to the cylindrical surface of the first annular structure, wherein the first annular structure and the teeth comprising a unitary monolithic structure, the first annular structure and the teeth consisting of steel, the second annular structure comprising a metal matrix composite, the metal matrix composite comprising a metal matrix and reinforcing material.

The sun gear, the annulus gear and all of the planet gears may each comprise a first annular structure and a second annular structure, a plurality of teeth extending radially from the first annular structure, the first annular structure having a cylindrical surface, the second annular structure abutting and being secured to the cylindrical surface of the first annular structure, wherein the first annular structure and the teeth comprising a unitary monolithic structure, the first annular structure and the teeth consisting of steel, the second annular structure comprising a metal matrix composite, the metal matrix composite comprising a metal matrix and reinforcing material.

Each planet gear may be rotatably mounted on the carrier by a journal bearing and/or at least one rolling element bearing. Each planet gear may be rotatably mounted on the carrier by two rolling element bearings.

The carrier may be connected to an output shaft and the annulus gear is connected to a static structure. The carrier may be connected to a static structure and the annulus gear is connected to an output shaft. The carrier may be connected to an output shaft and the annulus gear is connected to an output shaft.

The sun gear, the planet gears and the annulus gear may each comprise two sets of helical gear teeth. Alternatively, the sun gear, the planet gears and the annulus gear may each comprise one set of helical gear teeth.

The sun gear, the planet gears and the annulus gear may each comprise two sets of spur gear teeth. Alternatively, the sun gear, the planet gears and the annulus gear may each comprise one set of spur gear teeth.

The skilled person will appreciate that except where mutually exclusive, a feature described in relation to any one of the above aspects of the disclosure may be applied mutatis mutandis to any other aspect of the disclosure.

BRIEF DESCRIPTION OF THE DRAWINGS

Embodiments of the disclosure will now be described by way of example only, with reference to the Figures, in which.

DETAILED DESCRIPTION OF THE DISCLOSURE

Figure 1:
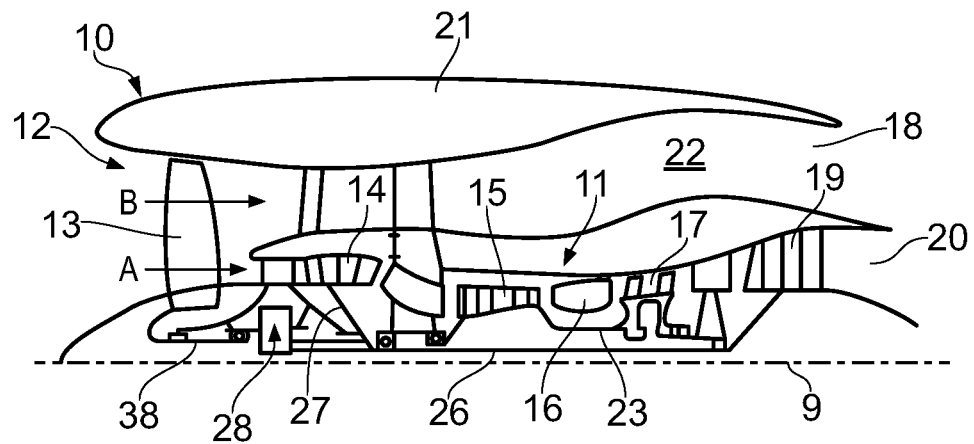
FIG. 1 is a part sectional side view of a geared turbofan gas turbine engine according to the present disclosure.
Figure 2:
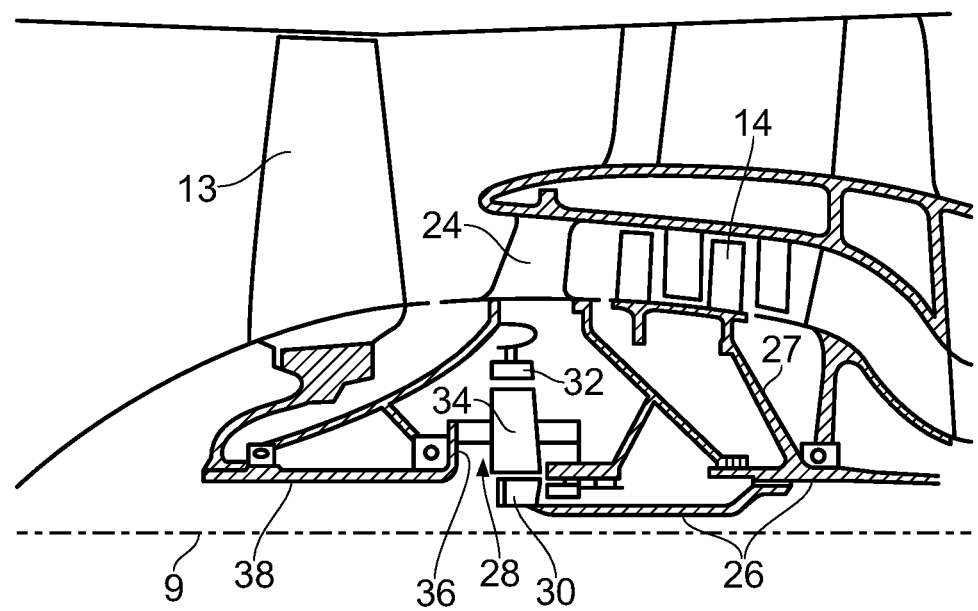
FIG. 2 is an enlarged part sectional side view of a portion of the geared turbofan gas turbine engine shown in FIG. 1.

With reference to FIGS. 1 and 2, a geared turbofan gas turbine engine is generally indicated at 10, having a principal and rotational axis 9. The engine 10 comprises, in axial flow series, an air intake 12, a propulsive fan 13, an intermediate-pressure, or booster, compressor 14, a high-pressure compressor 15, combustion equipment 16, a high-pressure turbine 17, a low-pressure turbine 19 and a core exhaust nozzle 20. The intermediate-pressure compressor 14, the high-pressure compressor 15, the combustion equipment 16, the high-pressure turbine 17 and the low-pressure turbine 19 form a core engine 11. A nacelle 21 generally surrounds the engine 10 and defines the intake 12, a bypass duct 22 and a bypass exhaust nozzle 18.

The gas turbine engine 10 works in the conventional manner so that air entering the intake 12 is compressed by the fan 13 to produce two air flows: a first air flow A into the intermediate-pressure compressor 14 and a second air flow B which passes through the bypass duct 22 to provide the majority of the propulsive thrust. The intermediate-pressure compressor 14 compresses the air flow directed into it before delivering that air to the high-pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high and low-pressure turbines 17, 19 before being exhausted through the core nozzle 20 to provide additional propulsive thrust. The high-pressure turbine 17 drives the high-pressure compressor 15 by a shaft 23. The low-pressure turbine 19 drives the intermediate-pressure compressor 14 directly via shafts 26 and 27. The low-pressure turbine 19 drives the fan 13 indirectly via the shaft 26, a gearbox 28 and a shaft 38. The gearbox 28 is a planetary gearbox and comprises a sun gear 30, an annulus gear 32, a plurality of planet gears 34 and a planet gear carrier 36. The sun gear 30 meshes with the planet gears 34 and the planet gears 34 mesh with the annulus gear 32. The planet gear carrier 36 constrains the planet gears 34 to precess around the sun gear 30 in synchronicity whilst enabling each planet gear 34 to rotate about its own axis independently. The planet gear carrier 36 is coupled via the shaft 38 to the fan 13 in order to drive its rotation about the engine axis 9. The annulus gear 32 is coupled to a static structure 24. The axes of the planet gears 34 and the axis of the planet gear carrier 36 are parallel to the engine axis 9. The shaft 38 is rotatably mounted in static structure by one or more bearings, e.g. rolling element bearings, e.g. roller bearings or ball bearings.

Figure 3:
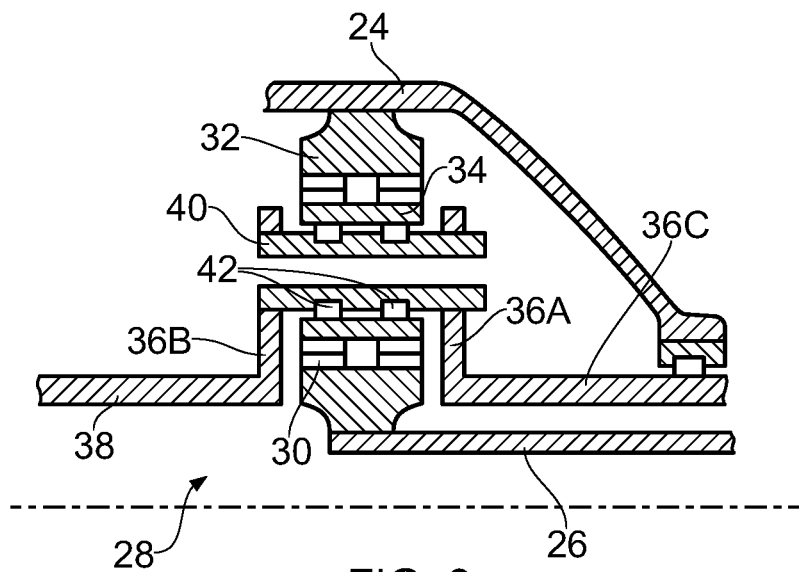
FIG. 3 is an enlarged cross-sectional view though the gearbox shown in FIG. 2.

The gearbox 28 is shown more clearly in FIG. 3 and the planet gear carrier 36 comprises a first ring 36A, a second ring 36B spaced axially from the first ring 36A, an extension shaft 36C and a plurality of circumferentially spaced axles 40 which extend axially between the first ring 36A and the second ring 36B. The extension shaft 36C of the planet gear carrier 36 is rotatably mounted in the static structure 24 by a bearing 43. The axles 40 are also arranged parallel to the engine axis 9 and thus the axis of the gearbox 28. The axially spaced ends of each axle 40 are secured to the planet gear carrier 36, e.g. to the first ring 36A and the second ring 36B. The first and second rings 36A and 36B each have a plurality of circumferentially spaced apertures 37A and 37B, each axle 40 locates in a corresponding aperture 37A extending through the first ring 36A and locates in a corresponding aperture 37B extending through the second ring 36B. The first ring 36A and the second ring 36B are secured together. The first ring 36A and the second ring 36B may be fastened, e.g. bolted, together or welded, brazed or bonded together. In this arrangement each planet gear 36 is arranged around a respective one of the axles 40, each planet gear 34 is rotatably mounted in the planet gear carrier 36 and in particular each planet gear 34 is rotatably mounted on a respective one of the axles 40 by a bearing arrangement 42. Each bearing arrangement 42 comprises a journal bearing or a rolling element bearing. In this particular arrangement each bearing arrangement 42 comprises two roller bearings. A lubrication system is arranged to supply lubricant to the planet gear bearing arrangements 42, the sun gear 30 and the planet gears 34. Each of the axles 40 is hollow. The first and second rings 36A and 36B and the extension shaft 36C may be separate components or alternatively may be an integral, monolithic or single component.

Figure 4:
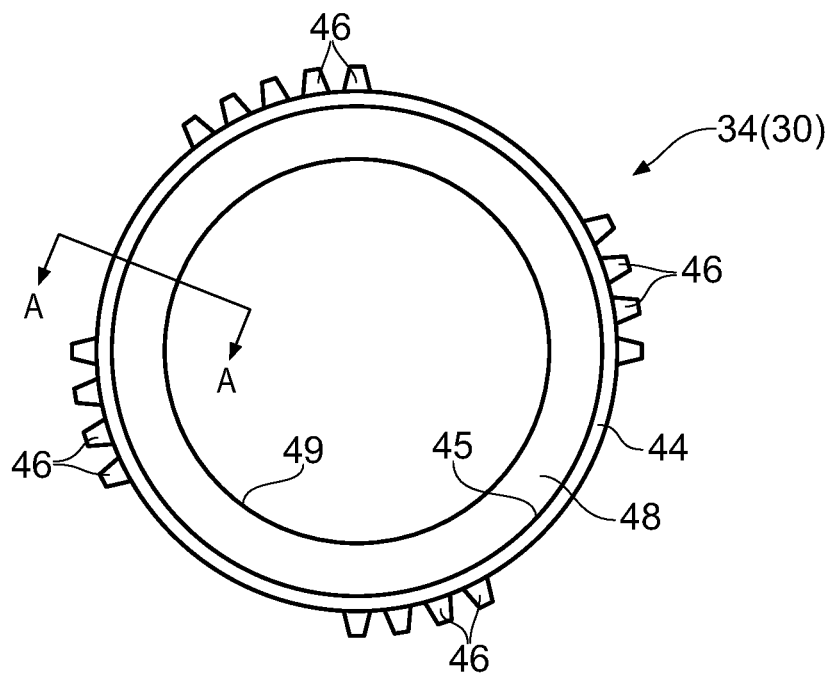
FIG. 4 is a further enlarged view of a planet gear of the gearbox shown in FIG. 3.
Figure 5:
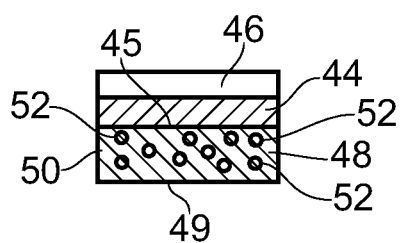
FIG. 5 is a cross-sectional view on line A-A through the planet gear shown in FIG. 4.

FIGS. 4 and 5 show one of the planet gears 34, of the gearbox 28 shown in FIG. 2, in more detail. One or more or all of the planet gears 34 comprises a first annular structure, or a first annular layer, 44, a plurality of teeth 46 extending radially from the first annular structure 44 and a second annular structure, or a second annular layer, 48 abutting and secured to a cylindrical surface 45 of the first annular structure 44. The first annular structure 44 and the teeth 46 comprise a unitary monolithic structure. The cylindrical surface 45 is a radially inner surface of the first annular structure 44, the teeth 46 extend radially outwardly from the first annular structure 44 and the second annular structure 48 is arranged radially within the first annular structure 44. The second annular structure 48 has a cylindrical inner surface 49 which forms a bore of the planet gear 34 and the bore of the planet gear 34 may be a bearing surface preferably for a journal bearing, but may be used with a rolling element bearing. The first annular structure 44, the teeth 46 and the second annular structure 48 preferably form a unitary monolithic structure. Alternatively, the first annular structure 44 and the teeth 46 form a unitary monolithic structure and the second annular structure 48 is joined to the first annular structure 44.

The first annular structure 44 and the teeth 46 consist of steel, e.g. gear steel or high strength steel. The gear steel or high strength steel may be AMS 6265, AIS 9310, Pyrowear 53, Pyrowear 675, CSS-42L, M50Nil, Questek C61, Questek C64 and BS-5156. (Pyrowear and Questek are registered trade marks). Pyrowear 53 consists of 3.25 wt % Mo, 2.0 wt % Ni, 2.0 wt % Cu, 1.0 wt % Si, 1.0 wt % Cr, 0.35 wt % Mn, 0.1 wt % C, 0.1 wt % V and the balance Fe and incidental impurities. Pyrowear 675 consists of 1.8 wt % Mo, 2.6 wt % Ni, 5.4 wt % Co, 0.4 wt % Si, 13.0 wt % Cr, 0.65 wt % Mn, 0.07 wt % C, 0.6 wt % V and the balance Fe and incidental impurities. AIS 9310 consists of 3.0 to 3.5 wt % Ni, 1.0 to 1.4 wt % Cr, 0.45 to 0.65 wt % Mn, 0.15 to 0.30 wt % Si, <0.025 wt % P, <0.025 wt % S, 0.08 to 0.15 wt % Mo and the balance Fe and incidental impurities. CSS-42L consists of 0.12 wt % C, 14.0 wt % Cr, 0.6 wt % V, 2.0 wt % Ni, 4.75 wt % Mo, 12.5 wt % Co, 0.02 wt % Nb and the balance Fe. S156 consists of 0.14 to 0.18 wt % C, 0.1 to 0.35 wt % Si, 0.25 to 0.55 wt % Mn, <0.015 wt % P, <0.012 wt % S, 1.0 to 1.4 wt % Cr, 0.2 to 0.3 wt % Mo, 3.8 to 4.3 wt % Ni and the balance Ni and incidental impurities. M50Nil consists of 0.13 wt % C, 4.2 wt % Cr, 0.25 wt % Mn, 4.25 wt % Mo, 3.4 wt % Ni, 0.2 wt % Si, 1.2 wt % V and the balance Fe and incidental impurities. Questek 63 consists of 0.15 wt % C, 3.5 wt % Cr, 9.5 wt % Ni, 18.0 wt % Co, 1.1 wt % Mo, 0.08 wt % V and the balance Fe and incidental impurities. Questek 61 consists of 0.11 wt % C, 3.5 wt % Cr, 7.5 wt % Ni, 16.3 wt % Co, 1.75 wt % Mo, 0.2 wt % W, 0.02 wt % V and the balance Fe and incidental impurities.

The second annular structure 48 comprises a metal matrix composite and the metal matrix composite comprises a metal matrix 50 and reinforcing material 52. The metal matrix 50 comprises aluminium, an aluminium alloy, steel, titanium or a titanium alloy. The steel may be one of the gear steels, or high strength steels, mentioned above or other suitable steel. The aluminium alloy may be a weldable aluminium alloy. The titanium alloy may be Ti64 which consists of 5.5 to 6.75 wt % Al, 3.5 to 4.5 wt % V and the balance Ti and minor additions and incidental impurities. The reinforcing material 52 may be a ceramic material. The reinforcing material 52 may comprise particles or may comprise fibres. The reinforcing material 52 may comprise one or more of alumina, boron, boron carbide, boron nitride, carbon, silicon carbide, silicon nitride, titanium carbide, titanium diboride, titanium nitride or tungsten carbide depending upon the matrix material 50. Some of the reinforcing materials 52 may be provided with a coating to prevent a chemical reaction with the matrix material 50. For example the reinforcing material 52 may comprise titanium diboride particles, titanium carbide particles, titanium nitride particles or tungsten carbide particles. The reinforcing material 52 may comprise alumina fibres, boron fibres, boron carbide fibres, boron nitride fibres, carbon fibres, silicon carbide fibres or silicon nitride fibres.

Suitable combinations are a steel first annular structure 44 and teeth 46 and a steel matrix 50 with titanium diboride particle 52 reinforced second annular structure 48 or a steel first annular structure 44 and teeth 46 and a steel matrix 50 with titanium carbide particle 52 reinforced second annular structure 48 or a steel first annular structure 44 and teeth 46 and a steel matrix 50 with titanium nitride particle 52 reinforced second annular structure 48. Other suitable combinations are a steel first annular structure 44 and teeth 46 and an aluminium alloy matrix 50 with titanium diboride particle 52 reinforced second annular structure 48 or a steel first annular structure 44 and teeth 46 and an aluminium alloy matrix 50 with titanium carbide particle 52 reinforced second annular structure 48 or a steel first annular structure 44 and teeth 46 and an aluminium alloy matrix 50 with titanium nitride particle 52 reinforced second annular structure 48. Further suitable combinations are a steel first annular structure 44 and teeth 46 and a titanium alloy matrix 50 with titanium diboride particle 52 reinforced second annular structure 48 or a steel first annular structure 44 and teeth 46 and a titanium alloy matrix 50 with titanium carbide particle 52 reinforced second annular structure 48 or a steel first annular structure 44 and teeth 46 and a titanium alloy matrix 50 with titanium nitride particle 52 reinforced second annular structure 48.

Other suitable combinations are a steel first annular structure 44 and teeth 46 and a steel matrix 50 with a boron nitride particle, or boron nitride fibre, 52 reinforced second annular structure 48. Other suitable combinations are a steel first annular structure 44 and teeth 46 and an aluminium alloy matrix 50 with a carbon fibre 52 reinforced second annular structure 48 or a steel first annular structure 44 and teeth 46 and an aluminium alloy matrix 50 with a boron carbide fibre 52 reinforced second annular structure 48 or a steel first annular structure 44 and teeth 46 and an aluminium alloy matrix 50 with a silicon carbide fibre 52 reinforced second annular structure 48. Further suitable combinations are a steel first annular structure 44 and teeth 46 and a titanium alloy matrix 50 with a silicon carbide fibre 52 reinforced second annular structure 48 or a steel first annular structure 44 and teeth 46 and a titanium alloy matrix 50 with a silicon nitride fibre 52 reinforced second annular structure 48.

Figure 6:
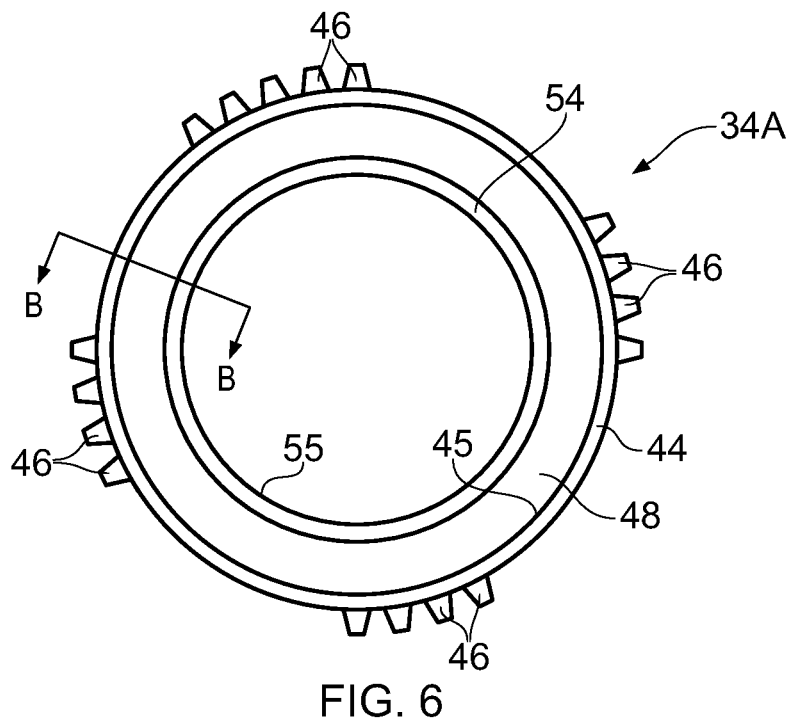
FIG. 6 is a further enlarged view of an alternative planet gear of the gearbox shown in FIG. 3.
Figure 7:
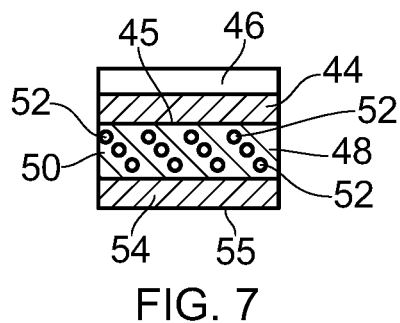
FIG. 7 is a cross-sectional view on line B-B through the planet gear shown in FIG. 6.

FIGS. 6 and 7 show an alternative planet gear 34A, of the gearbox 28, shown in FIG. 2, in more detail. One or more or all of the planet gears 34A comprises a first annular structure, or a first annular layer, 44, a plurality of teeth 46 extending radially from the first annular structure 44 and a second annular structure, or a second annular layer, 48 abutting and secured to a cylindrical surface 45 of the first annular structure 44. The first annular structure 44 and the teeth 46 comprise a unitary monolithic structure. The first annular structure 44 and the teeth 46 consisting of steel, e.g. gear steel or high strength steel as mentioned previously. The second annular structure 48 comprises a metal matrix composite, a metal matrix 50 and reinforcing material 52. The metal matrix 50 comprises aluminium, an aluminium alloy, steel, titanium or a titanium alloy as mentioned previously. The reinforcing material 52 may be a ceramic material. The reinforcing material 52 may comprise particles or may comprise fibres. The reinforcing material 52 may comprise one or more of alumina, boron, boron carbide, boron nitride, carbon, silicon carbide, silicon nitride, titanium carbide, titanium diboride, titanium nitride or tungsten carbide depending upon the matrix material 50. Some of the reinforcing materials 52 may be provided with a coating to prevent a chemical reaction with the matrix material 50. For example the reinforcing material 52 may comprise titanium diboride particles, titanium carbide particles, titanium nitride particles or tungsten carbide particles. The reinforcing material 52 may comprise alumina fibres, boron fibres, boron carbide fibres, boron nitride fibres, carbon fibres, silicon carbide fibres or silicon nitride fibres. The cylindrical surface 45 is a radially inner surface of the first annular structure 44, the teeth 46 extend radially outwardly from the first annular structure 44 and the second annular structure 48 is arranged radially within the first annular structure 44. The planet gear 34A also comprises a third annular structure, or third annular layer, 54 and the third annular structure 54 is arranged radially within and secured to the second annular structure 48. The third annular structure 54 comprises steel, preferably gear steel or high strength steel as discussed above. The third annular structure 54 has a cylindrical surface 55 which forms a bore of the planet gear 34A and the bore of the planet gear 34A may be a bearing surface preferably for a rolling element bearing, but may be used with a journal bearing. Thus, the third annular structure 54 provides good contact strength performance for use with rolling element bearings. The planet gear 34A is more suitable for use with a rolling element bearing than the planet gear 34 because of the presence of the third annular structure 54 on the planet gear 34A.

The first annular structure 44, the teeth 46, the second annular structure 48 and the third annular structure 54 preferably form a unitary monolithic structure. Alternatively, the first annular structure 44 and the teeth 46 form a unitary monolithic structure, the second annular structure 48 is joined to the first annular structure 44 and the third annular structure 54 is joined to the second annular structure 48.

Suitable combinations are a steel first annular structure 44, teeth 46 and third annular structure 54 and a steel matrix 50 with titanium diboride particle 52 reinforced second annular structure 48 or a steel first annular structure 44, teeth 46 and third annular structure 54 and a steel matrix 50 with titanium carbide particle 52 reinforced second annular structure 48 or a steel first annular structure 44, teeth 46 and third annular structure 54 and a steel matrix 50 with titanium nitride particle 52 reinforced second annular structure 48. Other suitable combinations are a steel first annular structure 44, teeth 46 and third annular structure 54 and an aluminium alloy matrix 50 with titanium diboride particle 52 reinforced second annular structure 48 or a steel first annular structure 44, teeth 46 and third annular structure 54 and an aluminium alloy matrix 50 with titanium carbide particle 52 reinforced second annular structure 48 or a steel first annular structure 44, teeth 46 and third annular structure 54 and an aluminium alloy matrix 50 with titanium nitride particle 52 reinforced second annular structure 48. Further suitable combinations are a steel first annular structure 44, teeth 46 and third annular structure 54 and a titanium alloy matrix 50 with titanium diboride particle 52 reinforced second annular structure 48 or a steel first annular structure 44, teeth 46 and third annular structure 54 and a titanium alloy matrix 50 with titanium carbide particle 52 reinforced second annular structure 48 or a steel first annular structure 44, teeth 46 and third annular structure 54 and a titanium alloy matrix 50 with titanium nitride particle 52 reinforced second annular structure 48.

Other suitable combinations are a steel first annular structure 44 and teeth 46 and a steel matrix 50 with a boron nitride particle, or boron nitride fibre, 52 reinforced second annular structure 48. Other suitable combinations are a steel first annular structure 44 and teeth 46 and an aluminium alloy matrix 50 with a carbon fibre 52 reinforced second annular structure 48 or a steel first annular structure 44 and teeth 46 and an aluminium alloy matrix 50 with a boron carbide fibre 52 reinforced second annular structure 48 or a steel first annular structure 44 and teeth 46 and an aluminium alloy matrix 50 with a silicon carbide fibre 52 reinforced second annular structure 48. Further suitable combinations are a steel first annular structure 44 and teeth 46 and a titanium alloy matrix 50 with a silicon carbide fibre 52 reinforced second annular structure 48 or a steel first annular structure 44 and teeth 46 and a titanium alloy matrix 50 with a silicon nitride fibre 52 reinforced second annular structure 48.

The advantage of planet gears 34 described previously is that the gear steel, or high strength steel, of the teeth 46 and the first annular structure 44 provide good contact and tooth bending strength performance. The second annular structure 48 reduces the mass of the planet gear 34 and maintains, or increases, the stiffness of the planet gear 34. The maintenance, or increase, of stiffness of the planet gear 34 helps to maintain roundness of the planet gear 34, e.g. maintain a cylindrical surface for the bore of the planet gear 34 or maintain the inner surface of the planet gear circular in planes perpendicular to the axis of the planet gear 34. The second annular structure 48 may have, depending upon the proportion of reinforcing material 52 within the second annular structure 48, a modulus of elasticity above that of the steel of the first annular structure 44 and have a density less than that of the steel of the first annular structure 44 and thus the second annular structure 48 reduces the mass of the planet gear 34 and maintains the stiffness of the planet gear 34. The proportion of reinforcing material 52 within the second annular structure 48 may be varied to provide the desired properties, e.g. increasing the proportion of reinforcing material 52 from an initial proportion reduces the density and mass and increases stiffness.

Although the present disclosure has been described with reference to a planet gear it is equally applicable to the sun gear 30 and the sun gear 30 may have the same structure as the planet gears 34 described with reference to FIGS. 4 and 5. The sun gear would have the same advantages as the planet gear, e.g. the second annular structure would reduce the mass of the sun gear and maintain, or increase, the stiffness of the sun gear.

Figure 9:
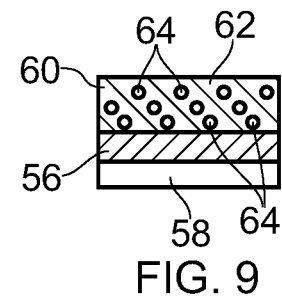
FIG. 9 is a cross-sectional view on line C-C through the annulus gear shown in FIG. 8.
Figure 8:
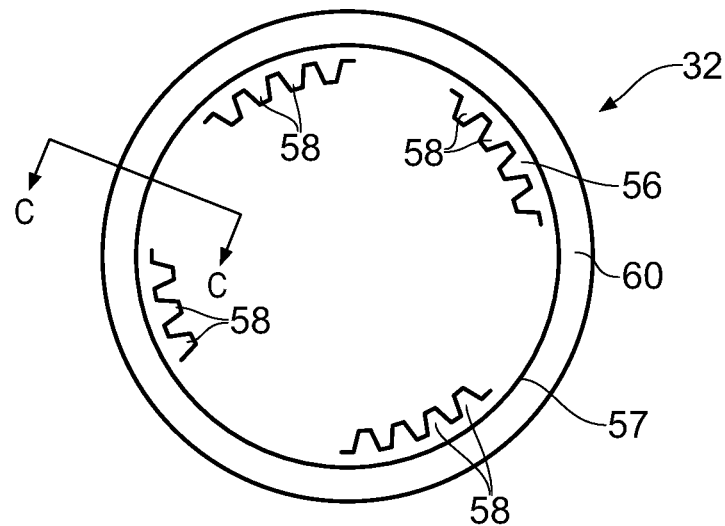
FIG. 8 is a further enlarged view of an annulus gear of the gearbox shown in FIG. 3.

FIGS. 8 and 9 show an annulus gear 32 of the gearbox 28 shown in FIG. 2, in more detail. The annulus gear 32 comprises a first annular structure, or a first annular layer, 56, a plurality of teeth 58 extending radially from the first annular structure 56 and a second annular structure, or a second annular layer, 60 abutting and secured to a cylindrical surface 57 of the first annular structure 56. The first annular structure 56 and the teeth 58 comprise a unitary monolithic structure. The first annular structure 56 and the teeth 58 consisting of steel, e.g. gear steel or high strength steel as mentioned above. The second annular structure 60 comprises a metal matrix composite, a metal matrix 62 and reinforcing material 64. The metal matrix 62 comprises aluminium, an aluminium alloy, steel, titanium or a titanium alloy as mentioned above. The reinforcing material 64 may comprise particles or may comprise fibres. The reinforcing material 64 may comprise one or more of alumina, boron, boron carbide, boron nitride, carbon, silicon carbide, silicon nitride, titanium carbide, titanium diboride, titanium nitride or tungsten carbide depending upon the matrix material 62. Some of the reinforcing materials 64 may be provided with a coating to prevent a chemical reaction with the matrix material 62. For example the reinforcing material 64 may comprise titanium diboride particles, titanium carbide particles, titanium nitride particles or tungsten carbide particles. The reinforcing material 64 may comprise alumina fibres, boron fibres, boron carbide fibres, boron nitride fibres, carbon fibres, silicon carbide fibres or silicon nitride fibres.

The cylindrical surface 57 is a radially outer surface of the first annular structure 56, the teeth 58 extend radially inwardly from the first annular structure 56 and the second annular structure 60 is arranged radially around the first annular structure 56.

The first annular structure 56, the teeth 58 and the second annular structure 60 preferably form a unitary monolithic structure. Alternatively, the first annular structure 56 and the teeth 58 form a unitary monolithic structure and the second annular structure 60 is joined to the first annular structure 56.

The annulus gear would have the same advantages as the planet gear, e.g. the second annular structure would reduce the mass of the annulus gear and maintain, or increase, the stiffness of the annulus gear.

Although the present disclosure has referred to a cylindrical inner surface for the bore of the planet gear, the bore may have other suitable shapes to cater for example for taper rolling element bearings. Thus, the inner surface for the bore of the, or each, planet gear is circular in cross-sections perpendicular to the axis of the planet gear. The inner surface of the, or each, planet gear may have two frusto-conical portions for two taper rolling element bearings.

In a first method of manufacture of the sun gear, the planet gear or the annulus gear is manufactured by additive manufacturing of powder material. The first annular structure, the teeth and the second annular structure are manufactured by additive manufacturing using powder material. The composition of the powder material is varied during the additive manufacturing process for example using steel powder for the first annular structure and teeth and steel powder and titanium diboride, titanium carbide or titanium nitride powder, or particles for the second annular structure. The additive manufacturing process comprises the direct laser deposition, or blown powder laser deposition or other suitable additive manufacturing processes.

In a second method of manufacture the teeth and the first annular structure are manufactured by additive manufacturing of powder material, the second annular structure is manufactured by sintering of powder material and the second annular structure is bonded to the first annular structure to form the sun gear, the planet gear or the annulus gear. For example steel powder is used to manufacture the first annular structure and teeth by additive manufacturing and steel powder and titanium diboride, titanium carbide or titanium nitride powder, or particles is used for sintering the second annular structure. The second structure is joined to the first structure by welding, by diffusion bonding, by brazing or by providing an interference fit.

In a third method of manufacture of the sun gear, the planet gear or the annulus gear the first annular structure and teeth are manufactured and the second annular structure is formed on the first annular structure by additive manufacturing. For example steel is used to manufacture the first annular structure and teeth and steel powder and titanium diboride, titanium carbide or titanium nitride powder, or particles is used to from the second annular structure on the first annular structure by additive manufacturing. The first annular structure and the teeth may be made by additive manufacturing or by conventional methods including forming a ring and machining the teeth.

It may be necessary to provide an interlayer between the first annular structure and the second annular structure, in each of the above arrangements, to enable the two structures to be bonded together. For example if the second annular structure comprises titanium or titanium alloy it may be necessary to provide an interlayer, e.g. nickel or nickel alloy, to enable it to bond to a first annular structure of gear steel.

As can be seen above at least a portion of the gear is manufactured by additive manufacturing. In the first method all of the gear is produced by additive manufacturing, in the second method the first annular structure and the teeth are manufactured by additive manufacturing and in the third method the second annular structure is manufactured by additive manufacturing.

As described above, the gas turbine engine comprises a propulsor, an intermediate-pressure compressor, a high-pressure compressor, a high-pressure turbine and a low-pressure turbine, the high-pressure turbine is arranged to directly drive the high-pressure compressor, the low-pressure turbine is arranged to directly drive the intermediate-pressure compressor and the low-pressure turbine is arranged to drive the propulsor via a gearbox.

Alternatively, the gas turbine engine comprises a propulsor, an intermediate-pressure compressor, a high-pressure compressor, a high-pressure turbine and a low-pressure turbine, the high-pressure turbine is arranged to directly drive the high-pressure compressor, the low-pressure turbine is arranged to directly drive the propulsor and the low-pressure turbine is arranged to drive the intermediate-pressure compressor via a gearbox.

Alternatively, the gas turbine engine comprises a propulsor, an intermediate-pressure compressor, a high-pressure compressor, a high-pressure turbine, an intermediate-pressure turbine and a low-pressure turbine, the high-pressure turbine is arranged to directly drive the high-pressure compressor, the intermediate-pressure turbine is arranged to directly drive the intermediate-pressure compressor and the low-pressure turbine is arranged to drive the propulsor via a gearbox.

Alternatively the gas turbine engine may comprise a propulsor, a high-pressure compressor, a high-pressure turbine and a low-pressure turbine, the high-pressure turbine is arranged to directly drive the high-pressure compressor and the low-pressure turbine is arranged to drive the propulsor via a gearbox.

Alternatively, the gas turbine engine comprises a first propulsor, a second propulsor, an intermediate-pressure compressor, a high-pressure compressor, a high-pressure turbine, an intermediate-pressure turbine and a low-pressure turbine, the high-pressure turbine is arranged to directly drive the high-pressure compressor, the intermediate-pressure turbine is arranged to directly drive the intermediate-pressure compressor and the low-pressure turbine is arranged to drive the first propulsor and the second propulsor via a gearbox.

Alternatively, the gas turbine engine comprises a first propulsor, a second propulsor, a low-pressure compressor, a high-pressure compressor, a high-pressure turbine, a low-pressure turbine and a free power turbine, the high-pressure turbine is arranged to directly drive the high-pressure compressor, the low-pressure turbine is arranged to directly drive the low-pressure compressor and the free power turbine is arranged to drive the first propulsor and the second propulsor via a gearbox.

Alternatively, the gas turbine engine comprises a first propulsor, a second propulsor, a low-pressure compressor, a high-pressure compressor, a high-pressure turbine and a low-pressure turbine, the high-pressure turbine is arranged to directly drive the high-pressure compressor, the low-pressure turbine is arranged to directly drive the low-pressure compressor and the low-pressure turbine is arranged to drive the first propulsor and the second propulsor via a gearbox.

The sun gear may be driven by a low-pressure turbine, the annulus gear may be secured to static structure and the carrier may be arranged to drive a propulsor.

The sun gear may be driven by the low-pressure turbine, the carrier may be secured to static structure and the annulus gear may be arranged to drive a propulsor. In this arrangement each planet gear rotates about its own axis and the carrier does not rotate about the engine axis. The axes of the planet gears are parallel to the engine axis.

The carrier may be driven by the low-pressure turbine, the sun gear may be secured to static structure and the annulus gear may be arranged to drive a propulsor.

The sun gear may be driven by the low-pressure turbine, the carrier may be arranged to drive a first propulsor and the annulus gear may be arranged to drive a second propulsor.

Although the present disclosure has been described with reference to planetary gearbox, star gearbox and differential gearbox arrangements it is equally possible for the gearbox to be arranged in a solar gearbox arrangement, e.g. the sun gear is secured to static structure and either the carrier is driven by an input drive shaft and the annulus gear drives an output drive shaft or the annulus gear is driven by an input drive shaft and the carrier drives an output drive shaft.

The propulsor may be a fan or a propeller.

It will be understood that the disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The project leading to this application has received funding from the Clean Sky 2 Joint Undertaking under the European Union's Horizon 2020 research and innovation programme under grant reference No. CS2-ENG-GAM-2014-2015-01.

The invention claimed is:

1. A gear comprising a first annular structure and a second annular structure,
   a plurality of teeth extending radially from the first annular structure, the first annular structure having a cylindrical surface, the first annular structure and the teeth consisting of steel,
   the second annular structure abutting and being secured to the cylindrical surface of the first annular structure, the second annular structure comprising a metal matrix composite, the metal matrix composite comprising a metal matrix and reinforcing material, the metal matrix is selected from the group consisting of aluminium, aluminium alloy, steel, titanium and titanium alloy, the reinforcing material comprising a ceramic material, the reinforcing material comprises one or more of alumina, boron, boron carbide, boron nitride, carbon, silicon carbide, silicon nitride, titanium carbide, titanium diboride, titanium nitride and tungsten carbide,
   the first annular structure, the teeth and the second annular structure are a unitary monolithic structure.

2. A gear as claimed in claim 1, wherein the reinforcing material comprises particles.

3. A gear as claimed in claim 1, wherein the reinforcing material comprises fibres.

4. A gear as claimed in claim 1, wherein the cylindrical surface is a radially inner surface, the teeth extend radially outwardly from the first annular structure and the second annular structure is arranged radially within the first annular structure.

5. A planet gear comprising a first annular structure, a second annular structure and a third annular structure,
   a plurality of teeth extending radially outwardly from the first annular structure, the first annular structure having a cylindrical inner surface, the first annular structure and the teeth consisting of steel,
   the second annular structure being arranged radially within and being secured to the cylindrical inner surface of the first annular structure, the second annular structure comprising a metal matrix composite, the metal matrix composite comprising a metal matrix and reinforcing material,
   the third annular structure being arranged radially within and being secured to the second annular structure, the third annular structure comprises steel,
   wherein the first annular structure, the teeth, the second annular structure, and the third annular structure are a unitary monolithic structure.

6. A planet gear as claimed in claim 5 wherein the steel is gear steel.

7. A planet gear as claimed in claim 5 wherein the first annular structure, the teeth, the second annular structure and the third annular structure are a unitary monolithic structure.

8. A planet gear as claimed in claim 5 wherein the metal matrix is selected from the group consisting of aluminium, aluminium alloy, steel, titanium and titanium alloy, the reinforcing material comprising a ceramic material, the reinforcing material comprises one or more of alumina, boron, boron carbide, boron nitride, carbon, silicon carbide, silicon nitride, titanium carbide, titanium diboride, titanium nitride and tungsten carbide.

9. A gear as claimed in claim 5, wherein the reinforcing material comprises particles.

10. A gear as claimed in claim 5, wherein the reinforcing material comprises fibres.

11. A gas turbine engine comprising a gearbox, the gearbox comprising a sun gear, an annulus gear, a plurality of planet gears and a planet gear carrier, the planet gears being rotatably mounted in the planet gear carrier, the sun gear meshing with the planet gears and the planet gears meshing with the annulus gear, wherein one or more of the sun gear, the annulus gear and a planet gear comprising a first annular structure and a second annular structure, a plurality of teeth extending radially from the first annular structure, the first annular structure having a cylindrical surface, the second annular structure abutting and being secured to the cylindrical surface of the first annular structure, wherein the first annular structure, the teeth, and the second annular structure comprising a unitary monolithic structure, the first annular structure and the teeth consisting of steel, the second annular structure comprising a metal matrix composite, the metal matrix composite comprising a metal matrix and reinforcing material.

12. A gas turbine engine as claimed in claim 11 wherein the metal matrix is selected from the group consisting of aluminium, aluminium alloy, steel, titanium and titanium alloy, the reinforcing material comprising a ceramic material, the reinforcing material comprises one or more of alumina, boron, boron carbide, boron nitride, carbon, silicon carbide, silicon nitride, titanium carbide, titanium diboride, titanium nitride and tungsten carbide.

13. A gas turbine engine as claimed in claim 11 wherein at least the annulus gear comprises a first annular structure and a second annular structure, a plurality of teeth extending radially from the first annular structure, the first annular structure having a cylindrical surface, the second annular structure abutting and being secured to the cylindrical surface of the first annular structure, wherein the first annular structure, the teeth, and the second annular structure comprising a unitary monolithic structure, the first annular structure and the teeth consisting of steel, the second annular structure comprising a metal matrix composite, the metal matrix composite comprising a metal matrix and reinforcing material.

14. A gas turbine engine as claimed in claim 11 wherein at least the annulus gear and all of the planet gears each comprises a first annular structure and a second annular structure, a plurality of teeth extending radially from the first annular structure, the first annular structure having a cylindrical surface, the second annular structure abutting and being secured to the cylindrical surface of the first annular structure, wherein the first annular structure, the teeth, and the second annular structure comprising a unitary monolithic structure, the first annular structure and the teeth consisting of steel, the second annular structure comprising a metal matrix composite, the metal matrix composite comprising a metal matrix and reinforcing material.

\* \* \* \* \*